March 16, 1971　　　　　　　　　　　　　　　　　　3,570,329
HANS-BERNHARD BOLZA-SCHÜNEMANN
METHOD FOR MANUFACTURING A PERFORATING TOOL AND METHOD FOR
PERFORATING BY MEANS OF THIS TOOL AS WELL AS A
DEVICE FOR REALIZING THIS METHOD
IN ROTARY PERFORATING MACHINES Filed Nov. 21, 1968　　　　　　　　　　　　　　　　5 Sheets-Sheet 2

United States Patent Office 3,570,329
Patented Mar. 16, 1971

3,570,329
METHOD FOR MANUFACTURING A PERFORAT-
ING TOOL AND METHOD FOR PERFORATING
BY MEANS OF THIS TOOL AS WELL AS A DE-
VICE FOR REALIZING THIS METHOD IN
ROTARY PERFORATING MACHINES
Hans-Bernhard Bolza-Schunemann, Wurzburg, Germany,
assignor to Schnellpressenfabrik Koenig & Bauer Ak-
tiengesellschaft, Wurzburg, Germany
Filed Nov. 21, 1968, Ser. No. 785,844
Claims priority, application Germany, Mar. 28, 1968,
P 17 61 055.8
Int. Cl. B21k 21/00
U.S. Cl. 76—101
10 Claims

ABSTRACT OF THE DISCLOSURE

The invention relates to a method for manufacturing a perforating tool and a procedure for perforating by means of this tool as well as a device for realizing this method in rotary perforating machines, necessitating longitudinal and transverse perforation.

BACKGROUND OF THE INVENTION

A simple method of perforating has already been known, in which punching is done in female dies by means of perforating combs and the sheets to be perforated are advanced by steps. In order to complete the perforation of a sheet it is, therefore, necessary to execute successively a number of working strokes so that the operating speed of this method is limited and preferably used for sheets.

Furthermore, it is known to manufacture a male die and a female die for a whole sheet and to join them as flat plates according to the platen principle. Since the perforation of a whole sheet of stamps is completed by one stroke, a higher output can be obtained. This method can also be used for web-fed rotary presses if the female and male die are swinging to and fro and move synchronous to the paper web during the working stroke or if, on the other hand, the paper web is stopped intermittently. Nevertheless the operating speeds are limited also in this case and above all the manufacture of the female die and male die is very time-consuming since thousands of holes have to be drilled for exact matching and half of these holes have to be provided with needle pins. It has already been tried to construct such female and male dies not as flat plates, but as curved segments in order to render possible a rotary perforation with a male and female die cylinder at high speeds. In the rotary principle, however, it is extremely difficult to drill the about 0.04 inch wide holes and expensive special drilling machines of maximum precision are necessary.

For the rotary perforation another proposal provides instead of the male die for a kind of letterpress relief plate which is produced photomechanically by etching metal plates or washing out photopolymer plastic plates. The paper is passed between this perforating die and a very fast rotating knife roller, whereby the knife roller is cutting perforation holes into those spots where the paper cannot give way, but is pressed against the knife roller by the perforating plate. Although this method avoids the trouble of drilling thousands of matching holes, it is, however, a disadvantage that the perforation holes are not evenly punched, but appear a little frayed and extremely high requirement must be met regarding the exactness and vibration-free run of the cutting roller.

SUMMARY OF THE INVENTION

It is an object of this invention to provide a perforating system the manufacturing costs of which are low and which facilitates the manufacture of new perforation die plates in a very short time and guarantees a reliable continuous operation of such perforating machines. The problem is solved by providing a method for manufacturing a perforating tool for the perforation of paper in rotary perforating machines, in which the desired perforation order is punched into a film by means of flat perforating comb or the film is produced by cold type. By utilizing this film a negative and a positive is obtained by optical reversal. In the manufacturing of a male die, for example, a 0.04 inch thick microzinc plate or brass plate is pre-bent according to the desired radius of curvature of the male die cylinder. This just formed plate is round-copied with the negative, roundetched to a depth of about 0.02 inch and subsequently hard chromium-plated. A female die of equal thickness is pre-bent according to the radius of curvature of the carrier plate on the die cylinder and is round-copied using the positive and the holes are etched through subsequently; the female die is fixed on the carrier plate in a well-defined position by means of two registering pins and the position of the longitudinal and transverse rows of the perforation are marked on the carrier plate through the female die, into the carrier plate according to the drawn marks in circumferential and longitudinal direction. Utilizing these markings grooves of a width of 0.08 to 0.12 inch and of equal depth are milled which are extended beyond the perforation holes up to a bore going through the carrier plate so that compressed air and suction air can be brought from within the die cylinder to the grooves below the female die. The female die is then positioned again on the carrier plate with the aid of the two registering bores and clamped.

Such a set of tools for perforating can be used in one operation which is characterized by the fact that in the circumferential and longitudinal direction of the cylinder there is one compressed air supply slot each and respectively on the opposite side one suction air slot to which the corresponding bores of the carrier plate are connected. Compressed air and suction air are fed to the cylinder via suitable conduits so that during the perforation process high-speed air currents will flow in the grooves of the carrier plate, transporting the punchings from the compressed air side to the suction air side and depositing them in the cylinder or in a filter. In carrying out this procedure the compressed air and suction air are not turned on until the die holes are packed with punchings against the outlet of compressed air and the inlet of suction air after several perforations. The method of manufacturing the perforating tool can still be altered by the fact that the die holes have a little larger diameter with regard to the perforating needles or punches. A thin hard steel plate is glued to this female die and holes are punched through the steel plate by means of the male die and thus the proper punching die is produced. Then as before grooves for removing the punchings are milled into the carrier plate. The punch holes in this thin and hard steel plate may also be produced by round-copying the perforation positive film and by etching.

A device for realizing this method, in which the male die and female die consist of plates produced photomechanically by etching metal or washing out photopolymer plastics and the female die is a compound plate of at least two layers and beneath the punch holes there is a net of air grooves and the punchings are removed from each groove by high-speed compressed air or suction air respectively.

The female die is secured by registering pins in the vertex on the carrier plate in a unique position. It is of such a size that it covers all milled air grooves of the carrier plate completely and leaves open only the securing holes of the carrier plate to the cylinder. For expediency's sake the die cylinder is provided with an opening which is covered after cleaning the interior of the cylinder.

In a further development of the invention the etched male die can be glued to a carrier plate so that the male and female die carrier can be adjusted to one another on the cylinder by means of screws without there being a danger of distortion.

In this method of operation each hole in the sheet to be perforated is produced most favourably as up to now by a cutting process and has, therefore, even edges. However, the male die and female die are not manufactured as up to now by drilling, but are matching exactly owing to the manufacturing process since they are derived from one and the same perforation pattern. Owing to this process it is relatively cheap to manufacture the perforating tool and a perfect matching of all needles or punches and holes is guaranteed.

BRIEF DESCRIPTION OF THE DRAWINGS

An embodiment of the invention is hereinafter described by way of example with reference to the accompanying drawings but it is clearly to be understood that the invention is by no means restricted to the details of this embodiment.

DESCRIPTION OF THE PREFERRED EMBODIMENT

Figure 1:
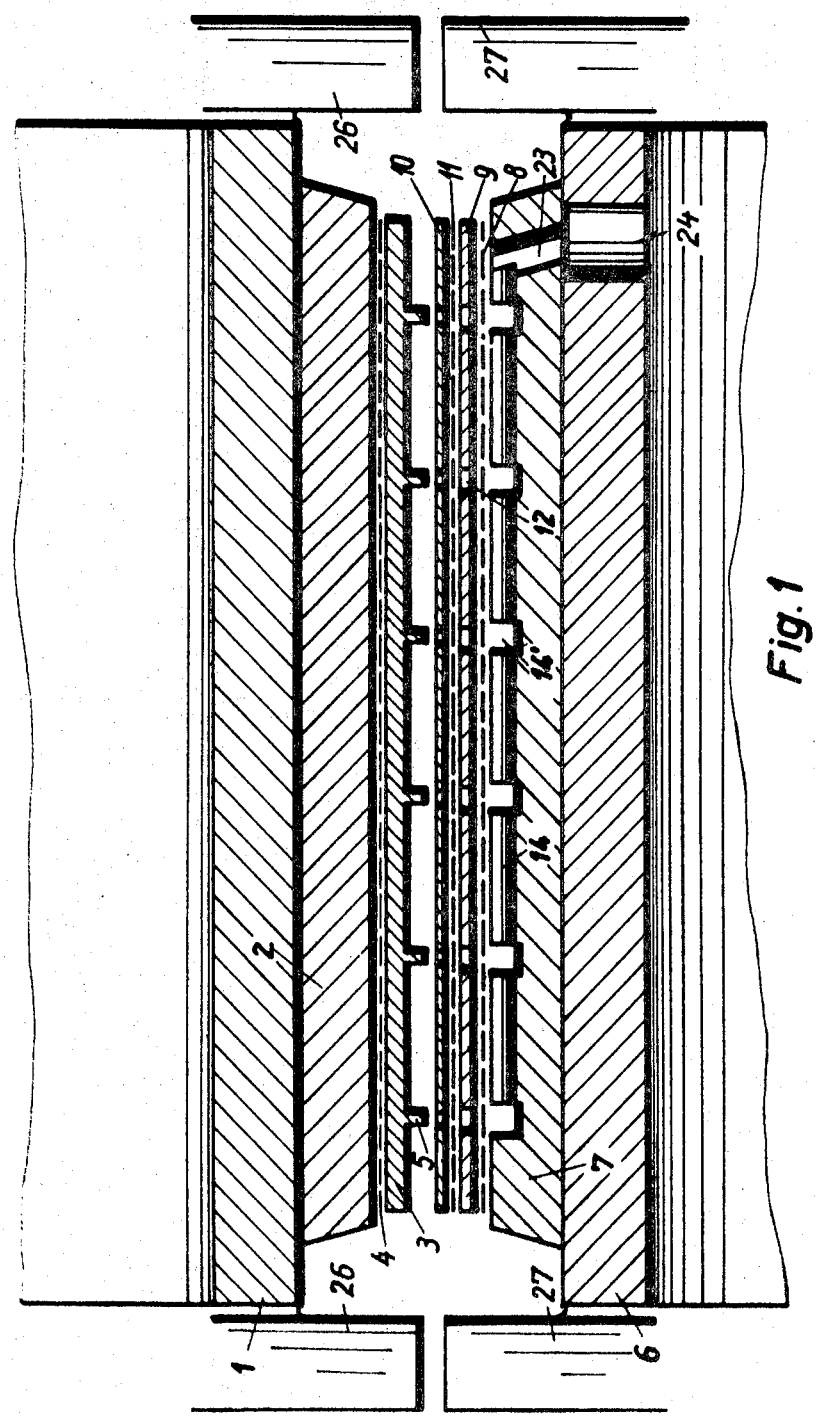
FIG. 1 shows cross section through a tool.
Figure 2:
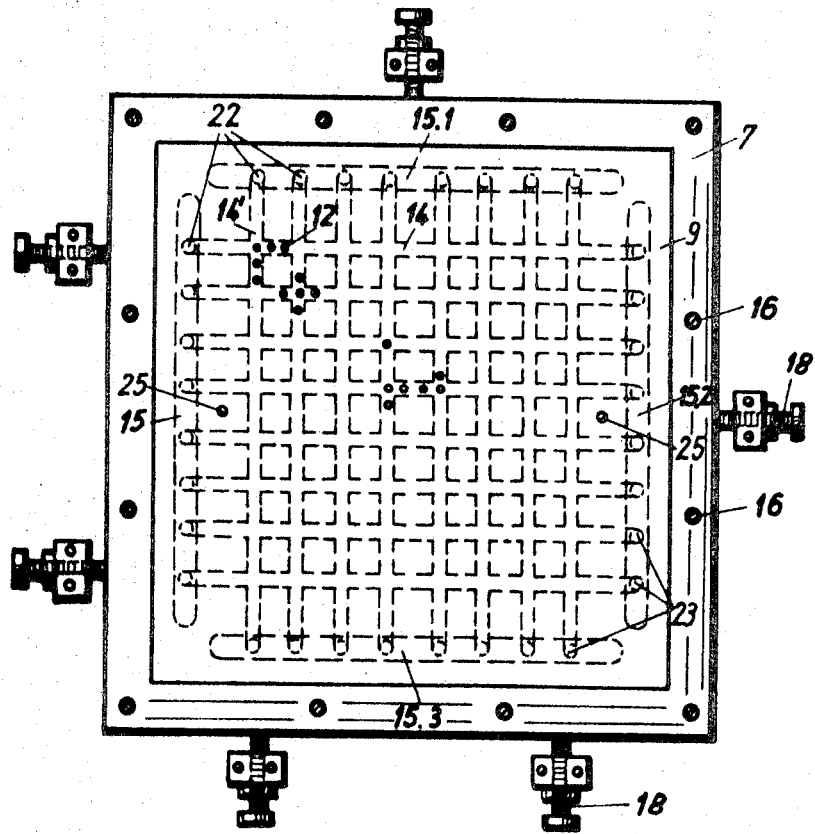
FIG. 2 a top view of a female die plate.
Figure 3:
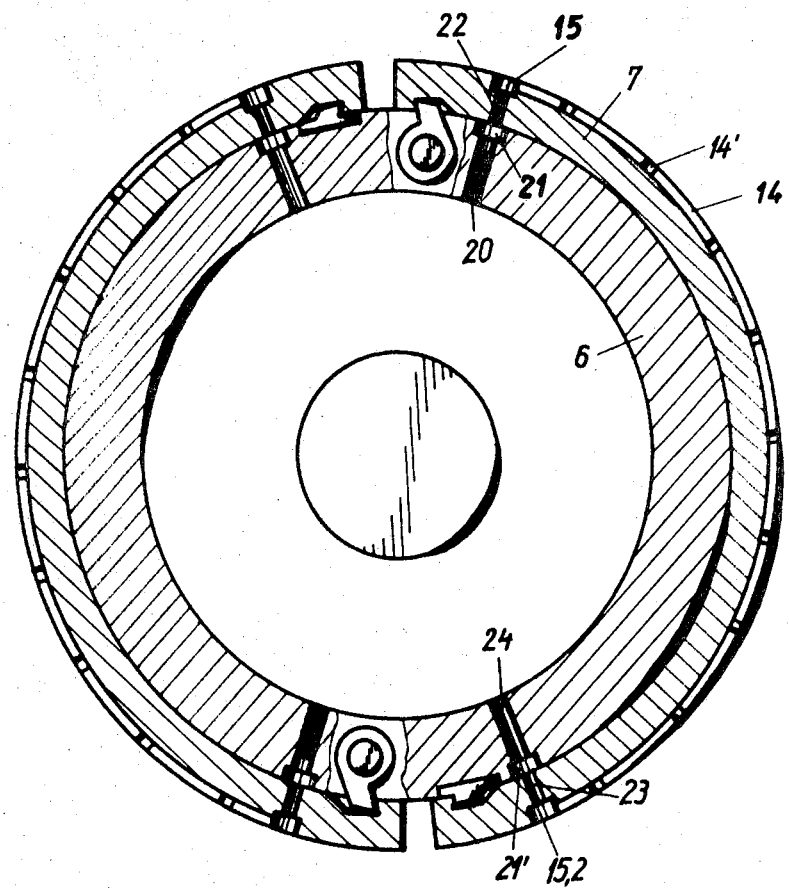
FIG. 3 is a cross section through the female die cylinder with clamped tool.
Figure 4:
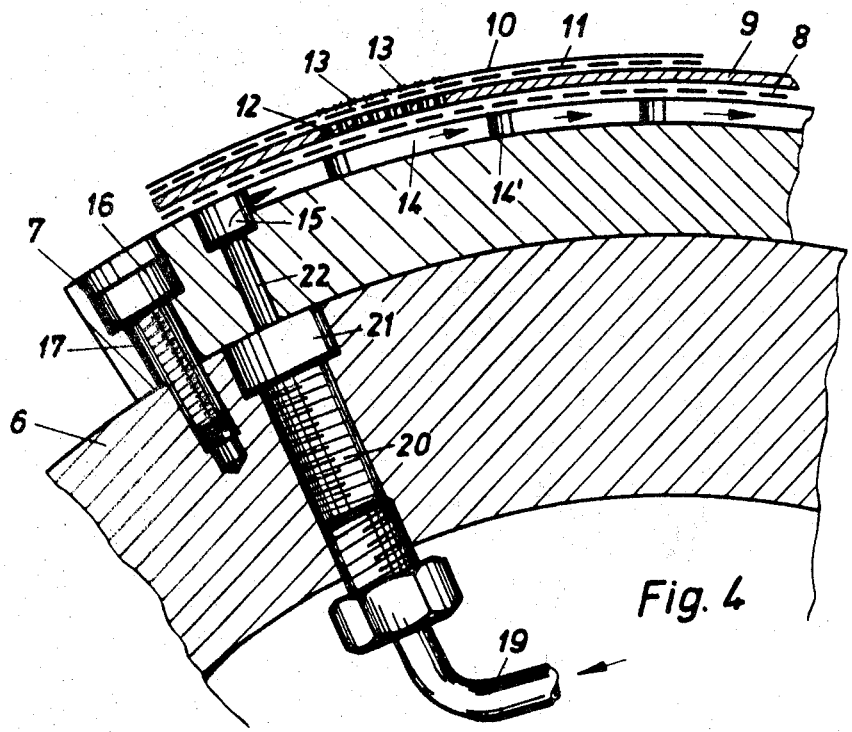
FIG. 4 is a detail sketch of FIG. 3 on an enlarged scale.
Figure 5:
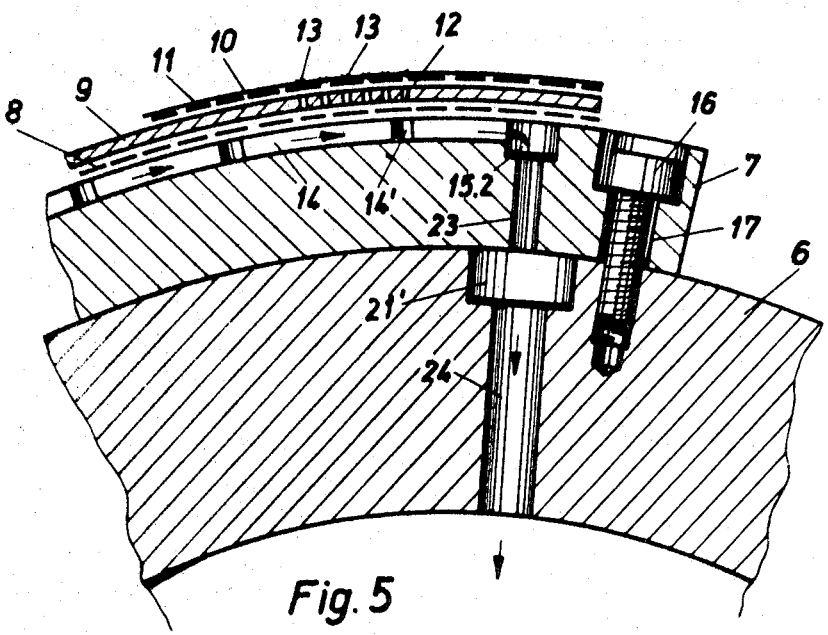
FIG. 5 shows further details of FIG. 3 with suction air connection.
Figure 6:
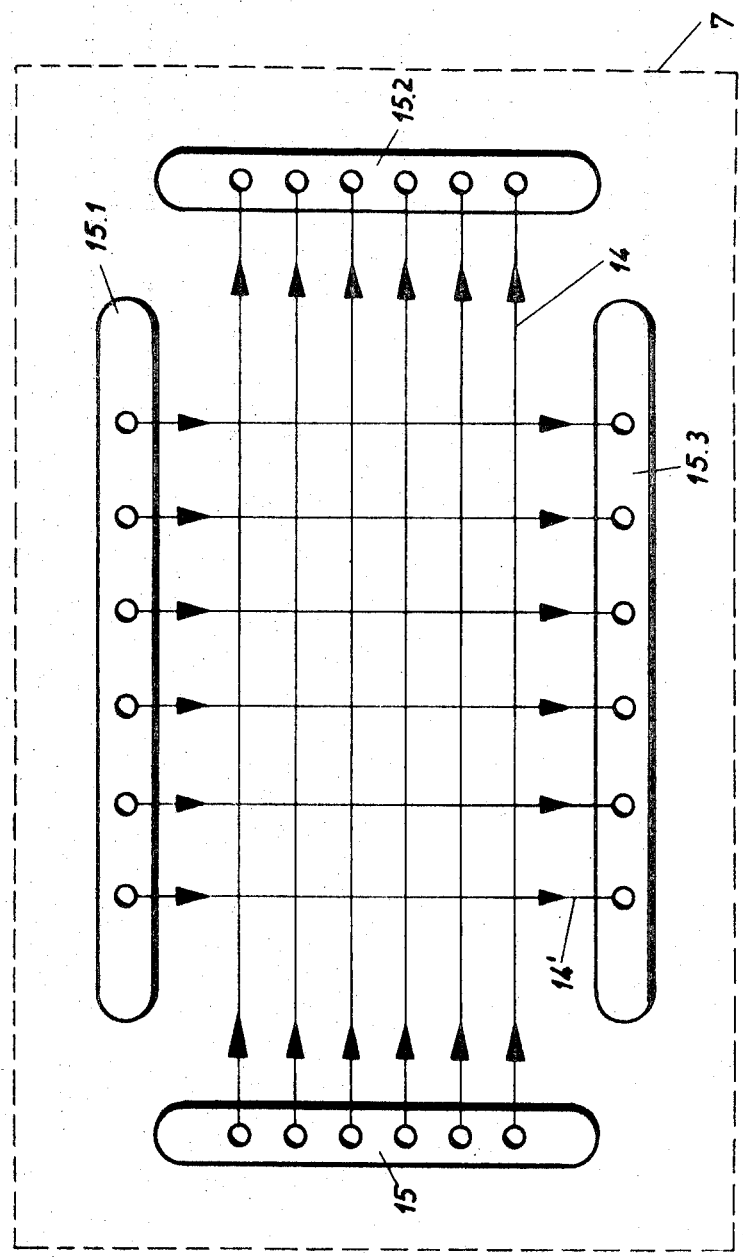
FIG. 6 is a scheme of air guiding.

On the cylinder 1 is mounted the carrier 2 to which the male die 3 is glued by means of the double-sided adhesive foil 4. The male die 3 is manufactured photomechanically either by washing out photopolymer or by etching metal. The surface of this plate is protected against wear by a hard chromium plating. The needles or punches 5 have a diameter of approximately 0.04 inch and a height of 0.02 inch. Opposite to the cylinder 1 is the cooperating die cylinder 6. To this cylinder the carrier shim 7 is screwed which carries by means of a double-sided adhesive foil 8 the female die 9 to which the steel plate 10 is glued by means of a double-side adhesive foil 11. The female die 9 is also produced photomechanically by washing out photopolymer. Its holes are a little greater in diameter than the diameter of the needles 5 of the male die 3. The holes 13 of the thin steel plate 10 are produced by punching by means of the needles 5 of the male die 3. The needles 5 are thus fitting tightly into the holes 13 of the steel plate 10. The grooves 14 and 14', respectively, are milled into the carrier shim 7. These are positioned exactly below the longitudinal and transverse rows of holes of the female die 9 and are connected with each other by the collection grooves 15 (see FIG. 2). The female die 9 is either screwed to the die cylinder 6 by the screws 16 and can be adjusted within the backlash between the screws 16 and the through bores 17 (see FIG. 4) by means of the setting screws 18 (see FIG. 2) in axial or circumferential direction or the carrier shim 7 is clamped to the die cylinder 6 by a tension lockup device corresponding to FIG. 3 and can be adjusted, as is wellknown, in axial as well as circumferential direction. The female die 9 is secured by means of two registering pins 25 (see FIG. 2) in the vertex on the carrier plate 7 in a well defined position.

Through the tube 19 (see FIG. 4) compressed air is supplied from the interior of the die cylinder 6 through the bore 20, distributed in the groove 21 and fed through the bores 22 in the carrier shim 7 to the collecting grooves 15. Now the compressed air is controlled in such a way that the air is not supplied simultaneously through the longitudinal and transverse grooves, but the compressed air is fed for a certain time to the collecting groove 15 (see FIG. 2) from which it flows through the longitudinal grooves 14 to the collecting groove 15.2. There it can be sucked off through the bores 23 and 24. Then this air current is switched off and changed over to the collecting groove 15.1 so that it will flow through the transversel grooves 14'. Then the compressed air is collected in the collecting groove 15.3 and from there sucked off through the corresponding grooves. This cycle is continuously repeated so that the air flows alternately through the longitudinal grooves and then through the transverse grooves. In this manner it is provided that the punchings can be reliably removed from the grooves. It is expedient to provide the male and female die cylinders 1 and 6 with cylinder bearers 26 and 27 in order to guarantee an exact development of the cylinders and an exact position of the male die 3 and the female die 9.

What I claim is:

1. Method of manufacturing a perforating tool for perforating paper in rotary perforating machines having die cylinders whereby longitudinal and transverse perforations are necessary, perforating a film with a desired perforation pattern, preparing a positive and a negative copy of the perforated film for the manufacture respectively of a male die and a female die, bending a first plate of microzinc or the like of the order of 0.04 inch thick to the required radius of curvature of the die cylinder, copying the pattern on the first plate using the negative copy of film, etching the first plate according to the pattern thereon to a depth of the order to 0.02 inch thereby providing a male die with needles or punches projecting radially therefrom, hard chromium plating the prepared male die, affixing the male die to the male die cylinder directly or through a carrier plate thereon, bending a second plate of microzinc or the like of the order of 0.04 inch thick to the required radius of its die cylinder, copying the pattern on the second plate using the positive copy of film, etching the holes through said second plate according to the pattern thereon thereby providing a female die, providing a carrier plate on the female die cylinder, applying the prepared female die to the carrier plate on the female die cylinder in proper position, marking on the carrier plate the position of the holes in the female die according to the pattern of longitudinal and transverse rows, removing the female die from its die cylinder, milling out grooves in the carrier plate according to the marked longitudinal and transverse grooves of a width of the order of 0.08 to 0.12 inch and of equal depth and extending the grooves to longitudinal and transverse manifold grooves formed at each side and each end of the carrier-plate, providing bores through the carrier plate and in communication with the manifold grooves therein, providing bores thorugh the female die cylinder to the interior thereof and in communication with the bores in the carrier plate, remounting the female die plate in proper position on the female die cylinder so that gas can flow to and through the bores to the manifold grooves and the grooves in the carrier plate in line with the perforations in the female die to remove punchings therefrom when paper material is run between the cooperating male and female dies mounted on their respective die cylinders.

2. Method according to claim 1 wherein a gas pressure is applied to the bores leading to one of the grooves of two pair of opposite manifold grooves and a suction is applied to the other bores leading to the opposite manifold grooves.

3. Method for perforating according to claim 1 or 2 in which pressure and suction are not applied until the die holes in the female die are packed with punchings after several perforations.

4. Method of manufacturing a perforating tool, especially a female die according to claim 1 in which the die holes formed in the female die have a little larger diameter than the formed punches in the male die and securing a thin hard steel plate to said applied female die and punching holes through the thin steel plate by use of the male die.

5. A device prepared according to the steps of claim 1 in which the male die and female die consist of plates produced photomechanically by etching metal or by washing out photopolymer and the female die is a compound plate of at least two layers, one of which is equivalent to said provided carrier plate and having the respective grooves and bores therein.

6. A device prepared according to the steps of claim 1 or 4 in which the female die is secured in a well defined position at the vertex on the carrier plate by means of two registering pins.

7. A device according to claim 1, in which the male die is secured to its cylinder or a carrier on its cylinder by foil means having adhesive on each face and in which the female die is secured to its carrier plate by foil means having adhesive on each face thereof and said foil means has necessary aligned holes therethrough.

8. A device according to claim 4 in which the female die is secured to its carrier plate by foil means having adhesive on each face and in which the thin steel plate is secured to the applied female die by foil means having adhesive on each face and said foil means has necessary aligned holes therethrough.

9. A device according to claims 1, 4 or 5 in which the female die is so large that it covers completely all milled grooves of the carrier plate.

10. A device according to claims 1, 4 or 5 including circular discs having a cylindrical peripheral surface attached in alignment with each other at each respective end of the male and female die cylinders and are in rolling contact during perforating.

References Cited

UNITED STATES PATENTS 2,816,025  12/1957  Dahlberg.
3,341,329   9/1967  Blake _____ 93—36

BERNARD STICKNEY, Primary Examiner

U.S. Cl. X.R.

96—36; 156—2, 18